United States Patent [19]

Shiobara et al.

[11] Patent Number: 5,540,502
[45] Date of Patent: Jul. 30, 1996

[54] GUIDE RAIL IN A LINEAR GUIDE DEVICE

[75] Inventors: Akira Shiobara; Toru Tsukada, both of Gunma, Japan

[73] Assignee: Nsk Ltd., Tokyo, Japan

[21] Appl. No.: 415,251

[22] Filed: Apr. 3, 1995

[30] Foreign Application Priority Data

Apr. 5, 1994 [JP] Japan .................... 6-067302

[51] Int. Cl.⁶ .................................... F16C 29/06
[52] U.S. Cl. .................................... 384/45
[58] Field of Search .................. 384/45, 43, 44; 464/168

[56] References Cited

U.S. PATENT DOCUMENTS

| | | | |
|---|---|---|---|
| 4,828,402 | 5/1989 | Osawa | 384/45 |
| 5,018,878 | 5/1991 | Tsukada et al. | 384/44 |
| 5,088,839 | 2/1992 | Tsukada | 384/45 |
| 5,090,821 | 2/1992 | Tsukada | 384/44 |

FOREIGN PATENT DOCUMENTS 0567032  10/1993  European Pat. Off. .

*Primary Examiner*—Lenard A. Footland
*Attorney, Agent, or Firm*—Sughrue, Mion, Zinn, Macpeak & Seas

[57] ABSTRACT

In a guide rail of a linear guide device, the distance A between the bottom of the counter bore of each of the bolt holes formed in the guide rail to mount the latter with mounting bolts and the bottom surface of the guide rail is smaller than the minimum distance B between the bottom surface of the guide rail and the end of the load rolling groove surface of the load ball rolling groove 3b which is closest to the bottom surface of the guide rail among the load ball rolling grooves, the end being closer to the bottom surface of the guide rail.

5 Claims, 4 Drawing Sheets

GUIDE RAIL IN A LINEAR GUIDE DEVICE

BACKGROUND OF THE INVENTION

The present invention relates to a guide rail employed in a linear guide device, and more particularly to an improvement of a guide rail fixing structure to increase the accuracy of motion of the slider of the linear guide device.

In general, a linear guide device, as shown in FIG. 7, comprises: a guide rail 1 which is extended axially; and a slide 2 which is movably mounted on the guide rail 1.

The guide rail 1 has two side surfaces 1*b* and 1*b* in each of which load ball rolling grooves 3 are formed in such a manner that they are extended axially (two load ball rolling grooves 3 in each of two side surfaces 1*b* and 1*b* in the case of FIG. 7). A body 2A of the slider 2 (hereinafter referred to as "a slider body 2A", when applicable) has right and left wings 4 and 4. Load ball rolling grooves (not shown) are formed in the inner surfaces of the wings 4 in such a manner that they are confronted with the load ball rolling grooves 3 of the guide rail, respectively. Furthermore, ball circulating paths are formed in the thick portions of the wings 4 in such a manner that they are connected to ends of the load ball rolling grooves thereby to form infinite circulation circles. A number of balls are rollingly fitted in the infinite circulation circles, so that the slider 2 is moved on the guide rail through the rolling of those balls.

A plurality of bolt holes 7 are formed in the guide rail 1 at predetermined intervals. The bolt holes 7 are through-holes extended from the top surface 1*a* of the body of guide rail 1 to the bottom surface 1*c*, and have counter bores 6 at the tops. Mounting bolts inserted into the bolt holes 7 are tightened to strongly push the bottom surfaces 6*a* of the counter bores 6 by the lower surfaces of the bolt heads, thereby to fixedly secure the guide rail, for instance, to a base stand. On the other hand, a driving structure to be guided such as a table is connected to the slider 2 so as to be moved along the guide rail 1.

In the guide rail 1 of the conventional linear guide device, as shown in FIG. 8, the depth h of the counter bore 6 of each of the bolt holes 7 (the distance between the top surface 1*a* of the guide rail 1 and the bottom 6*a* of the counter bore 6) is so determined that the head 8*a* of a hexagon socket head bolt 8 or a bolt cap 9 set on the bolt head 8*a* may not come above the top surface 1*a* of the guide rail 1. In other words, the depth h of the counter bore 6 of the bolt hole 7 is so determined as (1) to prevent the interference of the bolt head 8*a* or the bolt cap 9 with the slider 2 which is moved over the guide rail top surface 1*a*, and (2) to avoid the formation of recesses in the guide rail top surface 1*a* thereby to prevent the accumulation of chips therein.

The depth h of the bolt hole 7, which is determined only to prevent the interference of the bolt with the slider and to prevent the accumulation of dust on the guide rail, is substantially equal to the sum of the height of the head 8*a* of the hexagonal socket head bolt 8 and the thickness of the bolt cap 9. Hence, the distance A between the bottom 6*a* of the counter bore 6 of the bolt hole 7 and the guide rail bottom surface 1*c* is larger than the distance B between the guide rail bottom surface 1*c* and the lower end of the load rolling groove surface 3*f* (shaded in FIG. 8) of the load ball rolling groove 3 which is closet to the guide rail bottom surface 1*c* among the load ball rolling grooves 3 (A>B).

When the mounting bolt 8 inserted into the bolt hole 7 thus designed is tightened, the bottom 6*a* of the counter bore 6 is strongly pushed by the lower surface of the bolt head 8*a*, so that the part of the guide rail which is located below the bottom 6*a* of the counter bore 6 is deformed. Because of this deformation, the load rolling groove surface 3*f* of the load ball rolling groove 3 is also deformed. The amount of deformation can be measured with the probe of a dial gauge set on the load ball rolling groove 3 which is located below the bottom 6*a* of the counter bore. That is, the amount of deformation is obtained as the difference between the values measured before and after the bolts are tightened. In the case of FIG. 8 in which only the part of the load rolling groove surface remote from the guide rail bottom surface 1*c*, is above in the bottom 6*a* of the counter bore 6, the amount of deformation of the load rolling groove surface 3*f* measured in the above-described manner was more than 1 μm.

Recently, a linear guide device has been used for guiding the optical head of an optical disk driver for instance; that is, it is extensively employed in a field in which motion must be considerably high in accuracy to the order of microns (accuracies in the pitching, yawing and rolling of a slider which is moved on a guide rail). In this application of the linear guide device, the straightness of the load ball rolling grooves 3 of the guide rail is an important factor because it directly affects the accuracy of motion of the slider. Hence, in a linear guide device which must be high in the accuracy of motion, the deformation of the load ball rolling grooves which may be caused when the mounting bolts of the guide rail are tightened, becomes a serious problem.

SUMMARY OF THE INVENTION

In view of the foregoing, an object of the present invention is to provide a guide rail for a linear guide device in which the amount of deformation of the load ball rolling grooves is minimized which may be caused when the mounting bolts of the guide rail are tightened, and to provide a linear guide device in which the slider is considerably high in the accuracy of motion.

The foregoing object of the invention has been achieved by the provision of a guide rail for a linear guide device which is fixedly secured with bolts inserted into bolt holes which are through-holes with counter bores formed therein, and which supports a slider which is axially movable engaged with the guide rail through the rolling of a number of balls in load ball rolling grooves which are formed in both side surfaces of the guide rail in such a manner that the grooves are extended axially; in which, according to the invention, a distance between the bottom of the counter bore of each of the bolt holes and the bottom surface of the guide rail is smaller than a minimum distance between the bottom surface of the guide rail and the end of the load rolling groove surface of the load ball rolling groove that is closest to the bottom surface of the guide rail among the load ball rolling grooves.

In the guide rail according to the invention, the distance (A) between the bottom of each of the bolt holes and the bottom surface of the guide rail is smaller than the distance (B) between the bottom surface of the guide rail and the end of the load rolling groove surface of the load ball rolling groove that is closest to the bottom surface of the guide rail among the load ball rolling grooves.

When the mounting bolts inserted in the bolt holes are tightened after the bottom surface of the guide rail is set on the surface of the base stand, the bolt tightening forces applied to the bottoms of the counter bores of the bolt holes act on the surface of the base stand, so that the guide rail is fixedly secured to the base stand. Since the distance A is smaller than the distance B (A<B), the surfaces of all the load ball rolling grooves formed in the side surfaces of the guide rail are located above the bottoms of the counter bores of the bolt holes (with the guide rail set in such a manner that its bottom surface is lowest). Hence, the deformation of the guide rail which may be caused by the bolt tightening forces acting on the bottoms of the counter bores of the bolt holes does not substantially affect the surfaces of the load ball rolling grooves.

DETAILED DESCRIPTION OF THE PREFERRED EMBODIMENTS

Figure 6:
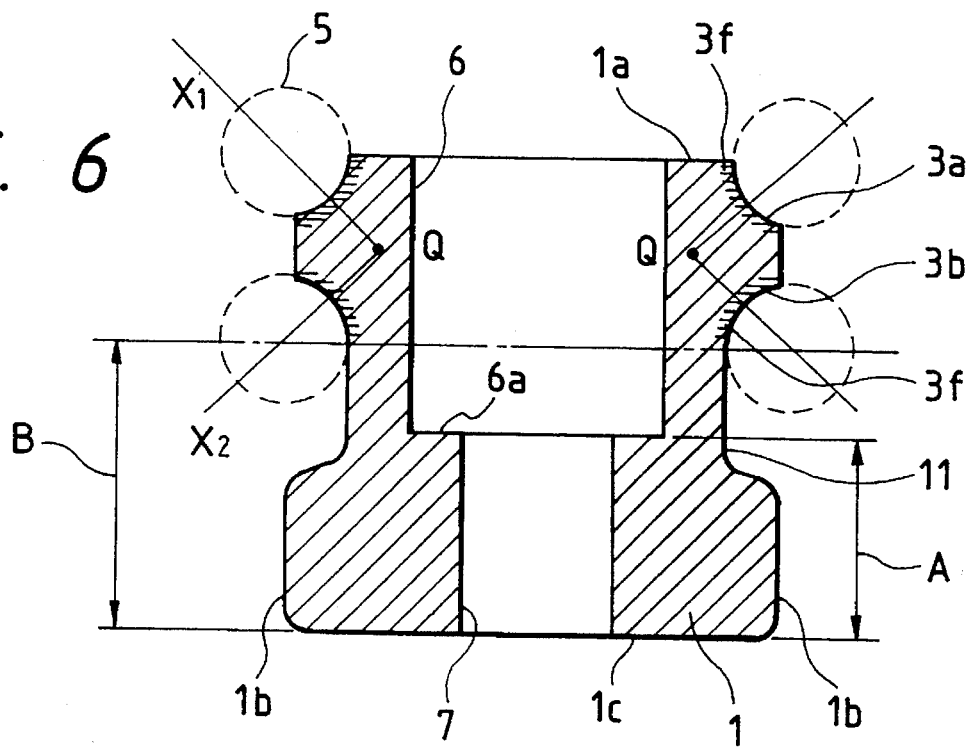
FIG. 6 is a sectional view showing a guide rail which constitutes a fourth embodiment of the invention.
Figure 7:
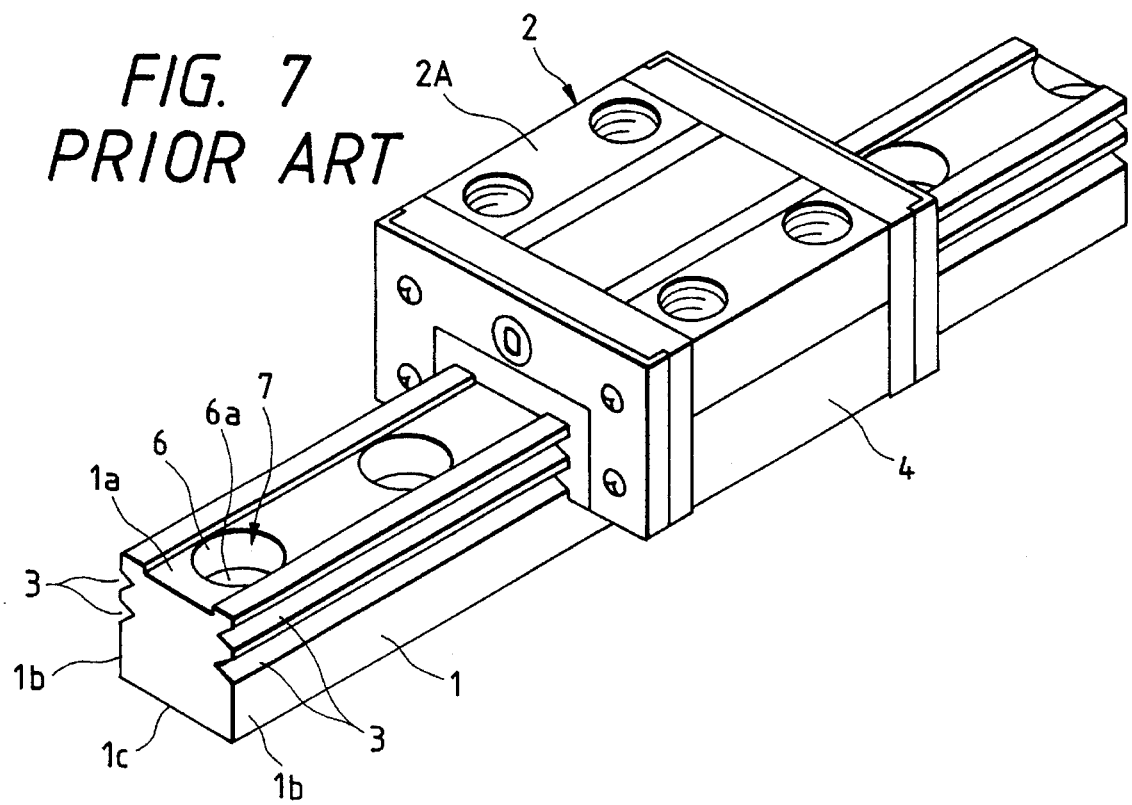
FIG. 7 is a perspective view showing the whole arrangement of a conventional linear guide device.
Figure 8:
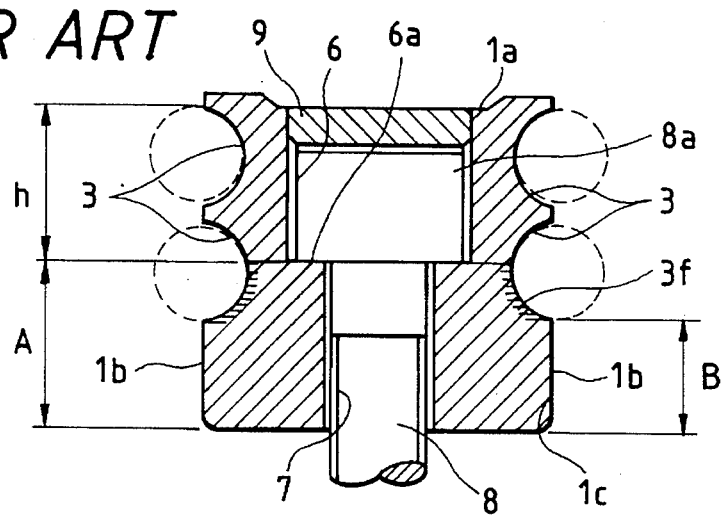
FIG. 8 is a sectional view for a description of a conventional guide rail mounting structure.

Preferred embodiments of the invention will be described with reference to FIGS. 1 through 6 in which parts corresponding functionally to those which have been described with reference to the conventional linear guide devices shown in FIGS. 7 and 8 are designated by the same reference numerals or characters.

Figure 1:
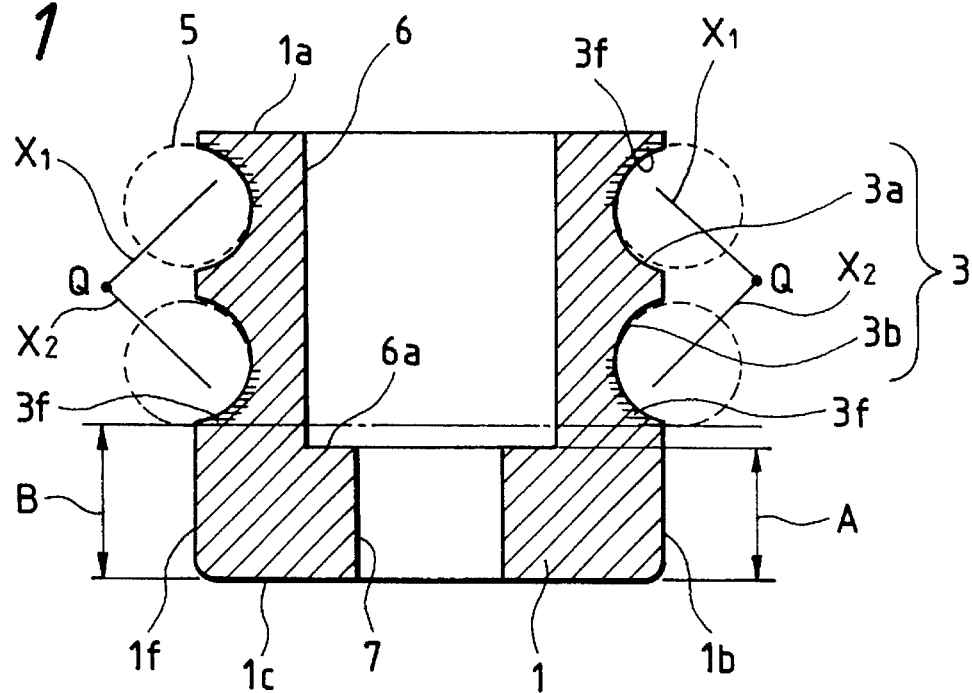
FIG. 1 is a sectional view showing a guide rail in a linear guide device, which constitutes a first embodiment of the invention.

FIG. 1 shows a first embodiment of the invention. Two load ball rolling grooves 3 are formed in each of the two side surfaces 1b and 1b of a guide rail 1 in such a manner that one of the grooves 3 is located above the other. Each of the upper load ball rolling grooves 3a is such that its section is semicircular, and a one quarter circumferential groove, i.e. the upper half of the groove, is a load rolling groove surface 3f (shaded in FIG. 1). Each of the lower load ball rolling grooves 3b is also such that its section is semicircular, and a one quarter circumferential groove, i.e. the lower half of the groove, is a load rolling groove surface 3f.

In the first embodiment, both the upper and lower load ball rolling grooves 3a and 3b have a Gothic arc shape, and they are of high rigidity type that the intersection Q of the contact direction lines $X_1$ and $X_2$ of the upper and lower ball rolling grooves 3a and 3b with balls 5 lies outside the guide rail 1 in the direction away from the central line of the guide rail 1.

The guide rail 1 is so designed that the distance A between the bottom 6a of each of the bolt holes 7 formed in the guide rail 1 and the guide rail bottom surface 1c is smaller than the minimum distance B between the guide rail bottom surface 1c and the end of the load rolling groove surface 3f of the lower load ball rolling groove 3b which is closest to the guide rail bottom surface 1c among the load ball rolling grooves 3 (the distance B being between the guide rail bottom surface 1c and the lower end of the load rolling groove surface 3f of the lower ball rolling groove 3b in this embodiment). That is, in the guide rail, A<B.

The guide rail 1 thus designed functions as follows:

As was described above, the distance A between the bottom 6a of each of the bolt holes 7 formed in the guide rail 1 and the guide rail bottom surface 1c is smaller than the minimum distance B between the guide rail bottom surface 1c and the end of the load rolling groove surface 3f of the lower load ball rolling groove 3b which is closest to the guide rail bottom surface 1c among the load ball rolling grooves 3, (A<B). Hence, the bottom 6a of the counter bore is closer to the guide rail bottom surface 1c than the load rolling groove surfaces 3f of all the load ball rolling grooves 3. This fact provides the following advantageous effect. When the mounting bolts are tightened after the bottom surface 1c of the guide rail 1 is set on the upper surface of a base stand, the downward forces of the mounting bolts applied to the bottoms 6a of the counter bores may deform the guide rail 1. However, the deformation of the guide rail thus caused will not substantially affect the groove surfaces of the load ball rolling grooves 3 because the latter are located above the bottoms 6a of the counter bores 6.

Figure 2:
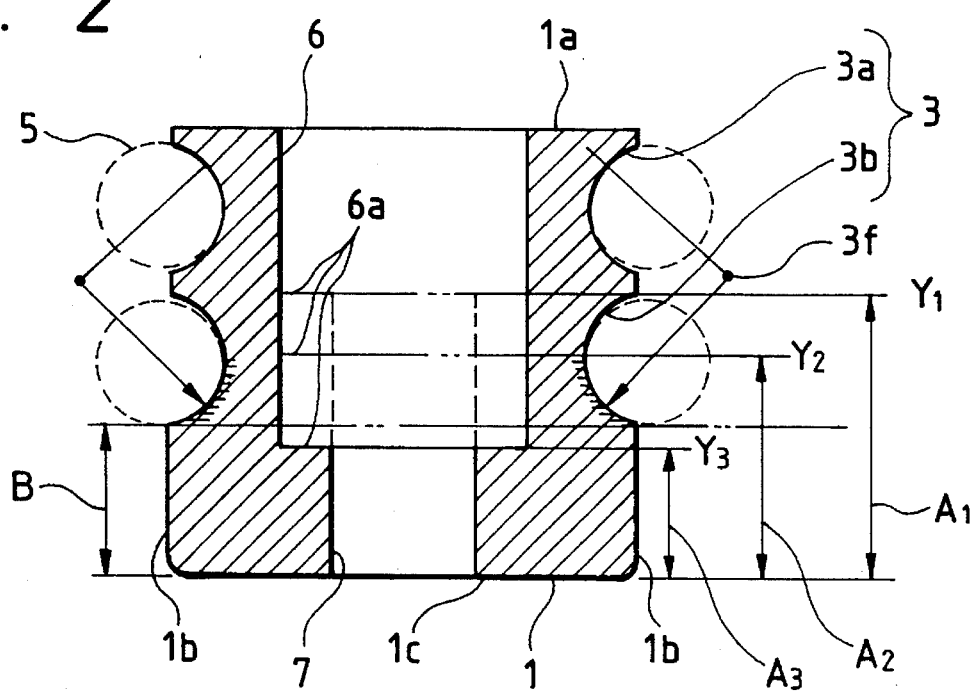
FIG. 2 is a sectional view for a description of experiments which are performed for the effect of the depth of the counter bore of a bolt hole in a guide rail on the deformation of load ball rolling grooves formed in the latter.
Figure 3:
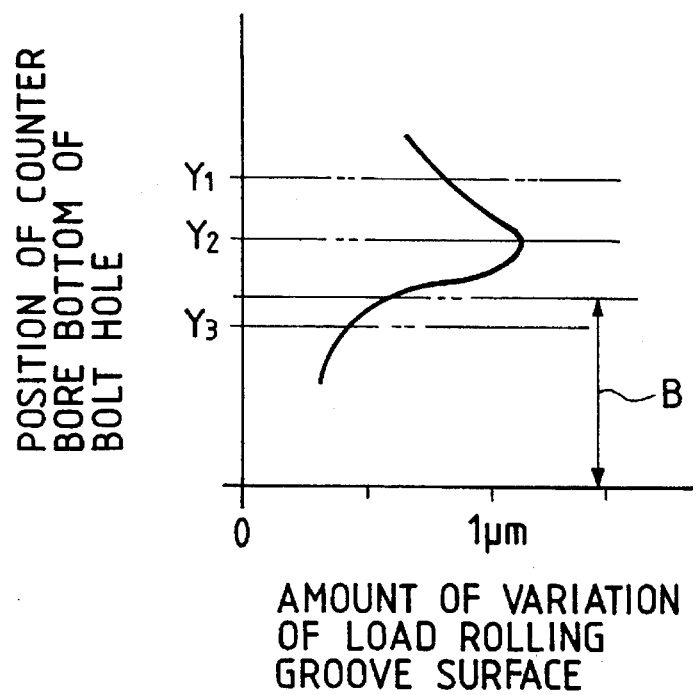
FIG. 3 is a graphical representation indicating the results of the experiments depited in FIG. 2.

FIGS. 2 and 3 are for a description of actual measurements given to the first embodiment.

Three specimens of the guide rail 1 as shown in FIG. 1 were formed which had distances $A_1$, $A_2$ and $A_3$ between the bottom 6a of the counter bore of each of the bolt holes 7 and the guide rail bottom surface 1c, respectively, as shown in FIG. 2. For each of the three specimens, with the probe of a dial gauge set on the load rolling groove surfaces 3f of the lower load ball rolling groove 3b, the toad rolling groove surface 3f was measured before and after the mounting bolts were tightened, to obtain the amount of variation of the load rolling groove surface 3f. The results of measurement are as indicated in FIG. 3. In FIG. 3, the vertical axis represents levels Y of counter bore bottoms 6a, while the horizontal axis represents amounts of variation (μm) detected by the probe of the dial gauge set on the load rolling groove surfaces 3f. The level $Y_1$ was for the specimen which had the distance $A_1$ between the counter bore bottom 6a and the guide rail bottom surface 1c; the level $Y_2$ was for the specimen which had the distance $A_2$; and the level $Y_3$ was for the specimen which had the distance $A_3$.

As is apparent from FIG. 3, in the case where the counter bore bottom 6a has the level $Y_1$, the load rolling groove surface 3f of the lower load ball rolling groove 3b is located much below the counter bore bottom 6a, and therefore the bolt tightening force applied to the counter bore bottom 6a greatly affects the lower load ball rolling groove 3b, and the amount of variation of the load rolling groove surface was approximately 1 μm.

In the case where the counter bore bottom 6a has the level $Y_2$, the upper end of the load rolling groove surface 3f of the lower load ball rolling groove 3b is substantially equal in level to the counter bore bottom 6a. Therefore, the load ball rolling groove is closest to the action point of the bolt tightening force, and the belt tightening force acting on the counter bore bottom 6a greatly affects the load ball rolling groove 3b. As a result, the amount of variation of the load rolling groove surface was larger than 1 μm.

On the other hand, in the case where the counter bore bottom 6a has the level $Y_3$, the condition (A<B) is satisfied, and the effect of the bolt tightening force, which acts on the counter bore bottom 6a, on the load ball rolling groove 3b is considerably small. As a result, the amount of variation of the load rolling groove surface is greatly suppressed, smaller than 0.5 μm.

As the level $Y_3$ of the counter bore bottom $6a$ approaches the guide rail bottom surface $1c$ (i.e., as the distance A decreases), the effect of the deformation of the guide rail on the straightness of the load ball rolling groove which is caused when the mounting bolts of the guide rail 1 are tightened is decreased, and accordingly the slider is improved in the accuracy of motion.

As is apparent from the above description, in the first embodiment, the amount of variation of the load rolling groove surface $3f$ is decreased, and accordingly the ball load rolling grooves 3 of the guide rail 1 are improved in straightness, and the slider 2 in the linear guide device is improved in the accuracy of motion.

Figure 4:
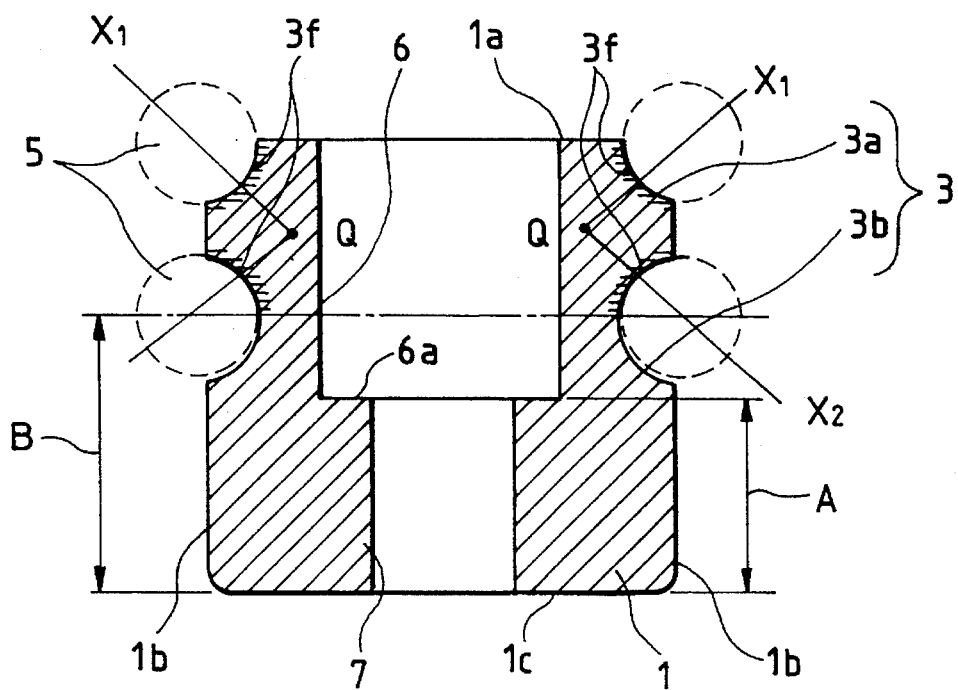
FIG. 4 is a sectional view showing a guide rail which constitutes a second embodiment of the invention.

FIG. 4 shows a second embodiment of the invention. In the second embodiment, upper and lower load ball rolling grooves 3 are formed in each of two side surfaces of the guide rail 1. The upper load ball rolling groove $3a$ is such that its section is quarter of a circle, and it is formed in the upper end portion of the guide rail 1. The whole surface of the upper load ball rolling groove $3a$ is a load rolling groove surface (shaded in FIG. 4). The lower load ball rolling groove $3b$ is such that its section is a semicircle. The upper half of the surface of the lower load ball rolling groove $3b$ is a load rolling groove surface $3f$.

In the second embodiment, too, the upper and lower load ball rolling grooves $3a$ and $3b$ are Gothic arc grooves. The guide rail is of so-called "automatic alignment type" that the intersection Q of the ball contact lines $X_1$ and $X_2$ of the upper and lower load ball rolling grooves $3a$ and $3b$ is located near the central line of the guide rail. That is, the load rolling groove surface $3f$ of the lower load ball rolling groove $3b$ which is closest to the guide rail bottom surface $1c$ among the load ball rolling grooves 3, is the upper half of the surface of groove $3b$, and the distance B between the lower end of the load rolling groove surface $3f$ and the guide rail bottom surface $1c$ is larger than that in the first embodiment.

In the second embodiment, too, the relation (A<B) is established. Hence, the second embodiment has the same advantages as the first embodiment.

Figure 5:
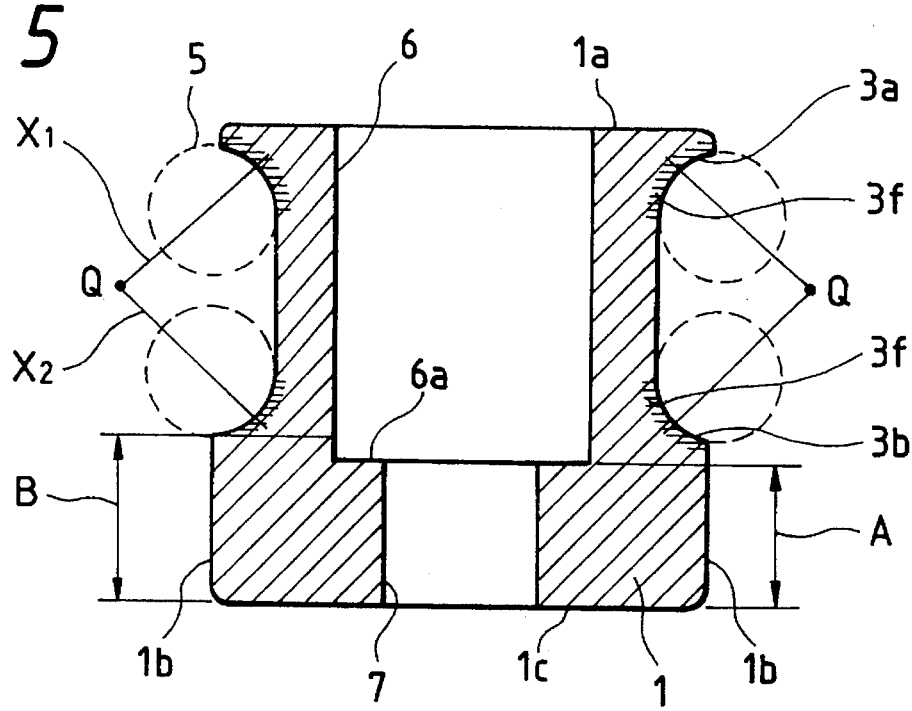
FIG. 5 is a sectional view showing a guide rail which constitutes a third embodiment of the invention.

FIG. 5 shows a third embodiment of the invention.

In the third embodiment, the technical concept of the invention is applied to a guide rail of high rigidity type which has circular-arc-shaped ball load rolling grooves 3. That is, in each of two side surfaces of the guide rail, upper and lower load ball rolling grooves $3a$ and $3b$ merge with each other, thus providing one wide groove. The upper curved portion of the wide groove, which is substantially quarter of a circle in section, is the load rolling groove surface $3f$ of the upper load ball rolling groove $3a$; and the lower curved portion of the wide groove, which is also substantially a quarter of a circle in section, is the load rolling groove surface $3f$ of the lower load ball rolling groove $3b$.

In the third embodiment, similarly as in the case of FIG. 1, the distance B is between the lower end of the lower load rolling groove surface $3f$ and the guide rail bottom surface $1c$. The distance B is larger than the distance A (A<B). Hence, the third embodiment has the same advantages as the first and second embodiments.

FIG. 6 shows a fourth embodiment of the invention.

In the fourth embodiment, the technical concept of the invention is applied to a guide rail of automatic alignment type having circular-arc-shaped ball load rolling grooves 3. Similarly as in the case of FIG. 4, each of the upper load ball rolling grooves $3a$ is such that its section is a quarter of a circle, and it is formed in the upper end portion of the guide rail. The whole surface of the upper load ball rolling groove $3a$ is a load rolling groove surface $3f$ (shaded in FIG. 6). On the other hand, each of the lower load ball rolling grooves $3b$ is formed into a wide groove 11, and the upper curved portion of the wide groove 11, which is substantially a quarter of a circle in section, is employed as the lower load rolling groove surface $3f$.

In the fourth embodiment, similarly as in the case of FIG. 4, the distance B is between the lower end of the lower load rolling groove surface $3f$ and the guide rail bottom surface $1c$, and the relation (A<B) is established. Hence, the fourth embodiment has the same effect as the first through third embodiments.

In each of the above-described embodiment, two load ball rolling grooves are formed in each of the two side surfaces of the guide rail. However, it should be noted that the invention is not limited thereto or thereby. That is, the technical concept of the invention may be applied to a guide rail which has only one load ball rolling groove or more than two load ball rolling grooves in each of the two side surfaces.

As was described above, in the guide rail according to the invention, the distance between the bottom of each of the bolt holes and the bottom surface of the guide rail is smaller than the minimum distance between the bottom surface of the guide rail and the end of the load rolling groove surface of the load ball rolling groove which is closest to the bottom surface of the guide rail among the load ball rolling grooves. Hence, when the mounting bolts inserted in the bolt holes are tightened after the bottom surface of the guide rail is set on the surface of the base stand, the deformation of the guide rail which may be caused by the bolt tightening forces acting on the bottoms of the counter bores of the bolt holes minimally affects the surfaces of the load ball rolling grooves. Accordingly, the load ball rolling grooves are prevented from being deformed, and the slider is improved in the accuracy of motion.

What is claimed is:

1. A guide rail in a linear guide device, comprising:
    a bolt hole passing through a bottom surface of said guide rail and having a counter bore formed therein, said guide rail being fixedly secured to a surface with a bolt inserted into said bolt hole; and
    load ball rolling grooves formed in both side surfaces of said guide rail in such a manner that said load ball rolling grooves extend axially along said guide rail, said guide rail supporting a slider which is axially moveable while being engaged with said guide rail as a number of balls roll in said load ball rolling grooves;
    wherein a first distance between a bottom of said counter bore of said bolt hole and said bottom surface of said guide rail is smaller than a second distance between said bottom surface of said guide rail and an end of a load rolling groove surface of said load ball rolling groove which is closest to said bottom surface of said guide rail among said load ball rolling grooves.

2. A guide rail as claimed in claim 1, wherein said guide rail is of a high rigidity type, each of said load ball rolling grooves is semicircular in cross-section, and said load rolling groove surface is one quarter of a circle in cross-section and is a lower half of said load ball rolling groove.

3. A guide rail as claimed in claim 1, wherein said guide rail is of an automatic alignment type and said load rolling groove surface is one quarter of a circle in cross-section and is an upper half of said load ball rolling groove.

4. A guide rail is claimed in claim 1, wherein said guide rail is of a high rigidity type, said load ball rolling grooves are shaped as an arc in cross-section, and said load rolling groove surface is one quarter of a circle in cross-section and is a lower corner of said circular-arc-shaped load ball rolling groove.

5. A guide rail as claimed in claim 1, wherein said guide rail is of an automatic alignment type, said load ball rolling grooves are wide grooves, and said load rolling groove surface is one quarter of a circle in cross-section and is an upper curved portion of said wide groove.

* * * * *